United States Patent [19]

Ando et al.

[11] Patent Number: 5,115,663
[45] Date of Patent: May 26, 1992

[54] METHOD FOR FORMING A CRANKSHAFT

[75] Inventors: Shyoichi Ando; Shuichi Yamane; Yoshihisa Doi; Hisayuki Sakurai; Haruo Meguro, all of Sayama, Japan

[73] Assignee: Honda Giken Kogyo Kabushiki Kaisha, Tokyo, Japan

[21] Appl. No.: 616,928

[22] Filed: Nov. 21, 1990

[30] Foreign Application Priority Data

| Nov. 25, 1989 | [JP] | Japan | 1-305711 |
| Nov. 28, 1989 | [JP] | Japan | 1-308506 |
| Dec. 1, 1989 | [JP] | Japan | 1-313662 |

[51] Int. Cl.$^5$ ............................................ B21D 53/84
[52] U.S. Cl. ............................... 72/370; 72/369; 72/342.94; 72/356; 72/323; 29/888.08
[58] Field of Search ........... 72/342.94, 342.96, 370, 72/369, 356, 355.2, 355.4, 355.6, 301, 300, 318, 306, 323; 29/888.08

[56] References Cited

U.S. PATENT DOCUMENTS

| 1,104,088 | 7/1914 | Wales | 72/370 |
| 1,152,858 | 9/1915 | Stewart | 72/356 |
| 1,946,117 | 2/1934 | Sparks | 72/355.6 |
| 2,165,472 | 7/1939 | Friedman | 72/370 |
| 2,472,261 | 6/1949 | Mueller | 29/888.08 |
| 2,743,500 | 5/1956 | Berg | 29/888.08 |
| 4,030,172 | 6/1977 | Gentry | 29/888.08 |

FOREIGN PATENT DOCUMENTS

| 43-12995 | 6/1968 | Japan . | |
| 49-24337 | 6/1974 | Japan . | |
| 1245391 | 7/1986 | U.S.S.R. | 72/356 |
| 15826 | of 1891 | United Kingdom | 29/888.08 |
| 2068857 | 8/1981 | United Kingdom | 72/369 |

Primary Examiner—Daniel C. Crane

[57] ABSTRACT

A shaped metallic article such as a crankshaft is produced from a hollow pipe which is commercially available. The hollow pipe, which has a predetermined wall thickness, is squeezed into a hollow blank pipe having a predetermined shape and wall thickness. A region of the hollow blank pipe is then heated, and the heated region is upset and bent into a crankshaft, for example. The hollow blank pipe is upset and bent by dies positioned one on each side of the gripped portion of the blank and moving toward each other, and also by punches. After the crankshaft is forged, one of the punches is released from the crankshaft before the dies are separated therefrom.

7 Claims, 8 Drawing Sheets

METHOD FOR FORMING A CRANKSHAFT

BACKGROUND OF THE INVENTION

1. Field of the Invention

The present invention relates to a method of and an apparatus for forming a shaped metallic article or forging a metallic article, and more particularly to a method of and an apparatus for forming an elongate article such as a crankshaft, for example, from a tubular or rod-shaped blank.

2. Prior Art

The so-called RR forging process is widely known and used to manufacture crankshafts, for example. According to the RR forging process, a rod-shaped blank is axially compressed by upsetting, and portions of the upset blank, which will correspond to crankpins, are bent by compression in a direction normal to the axial direction of the blank.

Various forging apparatus employing the RR forging process are known in the art, as disclosed in Japanese Patent Publications Nos. 43-12995 and 49-24337, for example.

The known forging apparatus have a die assembly composed of separate upper and lower dies, which are clamped and positioned by complex clamping and positioning mechanisms.

After crankshafts are formed by the RR forging process, they may be bent for various reasons.

More specifically, after the blank has been upset and bent, dies fitted over the opposite ends of the blank and a punch pressing the blank downwardly are separated from the formed blank. At this time, the crankshaft may be bent if the dies and the pressing punch are not displaced in synchronism with each other. Stated otherwise, if the pressing punch is lifted out of intimate contact with an upper surface of the crankshaft while the dies are not sufficiently spaced from the crankshaft but small gaps are left between the opposite ends of the crankshaft and the dies, the pressing punch as it is lifted may cause the crankshaft to be also lifted, depending on the degree of intimate contact between the pressing punch and the crankshaft. When this happens, the opposite ends of the crankshaft impinge upon the dies, and are bent thereby.

When the blank is bent in the RR forging process, residual stresses may be left in the crankshaft. Depending on such residual stresses, the crankshaft may be bent after it has been completely removed from the dies or the punch.

An elongate blank may also be bent in the vicinity of its center when punches are held against the opposite ends of the blank and axially pressed to axially swage or squeeze the blank.

In order to forge the blank with ease, it has been customary to heat the blank in advance. When the formed crankshaft is cooled, however, the crankshaft shrinks and may be bent.

Heretofore, a bent crankshaft has been corrected out of the bent configuration by a correcting press. Use of the press however adds a pressing step to the forging process, and is not economical since the cost of the die of the press is required.

Another way to correct a bent crankshaft has been to use a simple press for pressing the crankshaft in a direction opposite to the direction in which the crankshaft is bent. This correcting method is not efficient because the direction in which the crankshaft is bent and the extent to which it is bent have to be measured manually by a skilled worker, and the bent crankshaft cannot be corrected in many directions.

Another known correcting method is a rolling process by which a rotating grinding wheel is pressed against the entire circumference of a bent formed article, and the article is corrected out of the bent shape while it is being ground by the grinding wheel. Such a rolling process is used to correct a bent engine valve, for example. Some crankshafts, right after they are formed, have burrs produced between upper and lower dies. Since burrs are attached on opposite sides of the crankshaft shank and the crankshaft shank is not of a true circular shape, but is somewhat deformed, it is impossible to correct the crankshaft according to the rolling process.

Certain crankshafts are hollow because of the need for use with an oil gallery or because a reduction in weight is desired.

When a hollow crankshaft is to be produced, it has to be formed from a pipe blank which has a relatively large wall thickness inasmuch as the produced crankshaft requires a considerable degree of mechanical strength in its crankpins and journals. However, commercially available hollow blanks or pipes are limited with respect to diameter and wall thickness, and may not be suitable to the manufacture of optimum crankshafts. Since it is difficult to obtain commercially available hollow blanks of large wall thickness, an additional process is usually required to forge hollow blanks in addition to the squeezing process or the RR forging process. Especially when a crankshaft is to be produced from a commercially available hollow blank, since the opposite end of the crankshaft has a smaller diameter than those of the crankpins and journals, the hollow blank has to be swaged or squeezed to a large degree in order to obtain a desired configuration.

If the diameter of the opposite ends of the crankshaft is very small as compared with those of the crankpins and journals thereof, then the squeezing ratio or the percentage of diameter reduction becomes excessively large, causing the formed crankshaft to crack or buckle.

While it is still possible to forge the opposite ends of the crankshaft in an increased number of steps including the squeezing, as described above, the counterweights of a crankshaft produced by the RR forging, which counterweights are of bent or curved configuration, cannot be forged in such an increased number of steps.

SUMMARY OF THE INVENTION

It is an object of the present invention to provide a method of and an apparatus for forming a shaped metallic article of desired shape with high accuracy in a short period of time.

According to the present invention, there is provided a method of forming a shaped metallic article, comprising the steps of squeezing a hollow pipe having a predetermined wall thickness into a hollow blank pipe having a predetermined shape and wall thickness, locally heating a region of the hollow blank pipe, and upsetting and bending the heated region of the hollow blank pipe.

The squeezing step comprises the step of uniformizing the wall thickness of the pipe to a substantially constant wall thickness. Alternatively, the squeezing step comprises the step of squeezing a selected region of the pipe to increase the wall thickness of the squeezed region. In addition, the squeezing step comprises the steps of inserting a core rod into the pipe and squeezing the pipe while constraining the pipe radially inwardly with the core rod.

According to the present invention, there is also provided a method of forming a shaped metallic article, comprising the steps of gripping a portion of an elongate bank with a pair of punches, upsetting and bending the blank with dies positioned one on each side of the gripped portion of the blank and moving toward each other, and with the punches, and thereafter, releasing one of the punches from the blank before the dies are separated from the blank.

The method further includes the step of ejecting the blank after the dies are separated from the bank.

According to the present invention, there is further provided a method of forming a shaped metallic article, comprising the steps of gripping a portion of an elongate blank with a pair of punches, upsetting and bending the blank with dies positioned one on each side of the gripped portion of the blank and moving toward each other, and with the punches, thereby forming an elongate article, and thereafter, rolling the elongate article to correct the same out of a bent configuration.

The elongate article comprises a crankshaft having journals, the rolling step comprising the step of rolling the journals.

According to the present invention, there is also provided an apparatus for forming a shaped metallic article, comprising a pair of dies for receiving opposite ends of an elongate blank, the dies being movable toward and away from each other, a pair of punches for gripping and bending the blank, the punches being displaceable in a direction normal to a longitudinal axis of the blank, a vertically movable body supporting one of the punches, a first actuator for displacing the one of the punches, the first actuator being mounted on the vertically movable body, a second actuator for displacing the other punch toward the one punch, first buffer means associated with the first punch, for absorbing shocks from the first punch, and second buffer means associated with the second punch, for absorbing shocks from the second punch.

The first and second actuators comprise first and second cylinders, respectively, operable by a fluid under pressure. The first cylinder includes a first pressure chamber defined partly by a head cover, and the second cylinder includes a second pressure chamber defined partly by a head cover, the first buffer means comprising a first passage communicating with the first pressure chamber, and first valve means connected to the first passage, for controlling the flow of the fluid under pressure to displace the one punch, the second buffer means comprising a second passage communicating with the second pressure chamber, and second valve means connected to the second passage, for controlling the flow of the fluid under pressure to displace the other punch.

The apparatus further comprises a source of the fluid under pressure, the first and second passages being connected to the source, the first and second cylinders including respective piston rods, and respective chambers defined around the piston rods, and first and second auxiliary buffer means communicating with the chambers, respectively, of the first and second cylinders.

The apparatus further comprises a pair of second punches movably mounted in the dies, and a pair of actuators coupled to the dies, respectively, for displacing the second punches in the dies in an axial direction of the elongate blank.

The above and other objects, features and advantages of the present invention will become more apparent from the following description when taken in conjunction with the accompanying drawings in which preferred embodiments of the present invention are shown by way of illustrative example.

DETAILED DESCRIPTION OF THE PREFERRED EMBODIMENTS

First, an apparatus for forming a hollow crankshaft according to an RR forging process will be described below, and then a process of squeezing a commercially available pipe and forming the squeezed pipe into a crankshaft with the above apparatus will be described.

Figure 1:
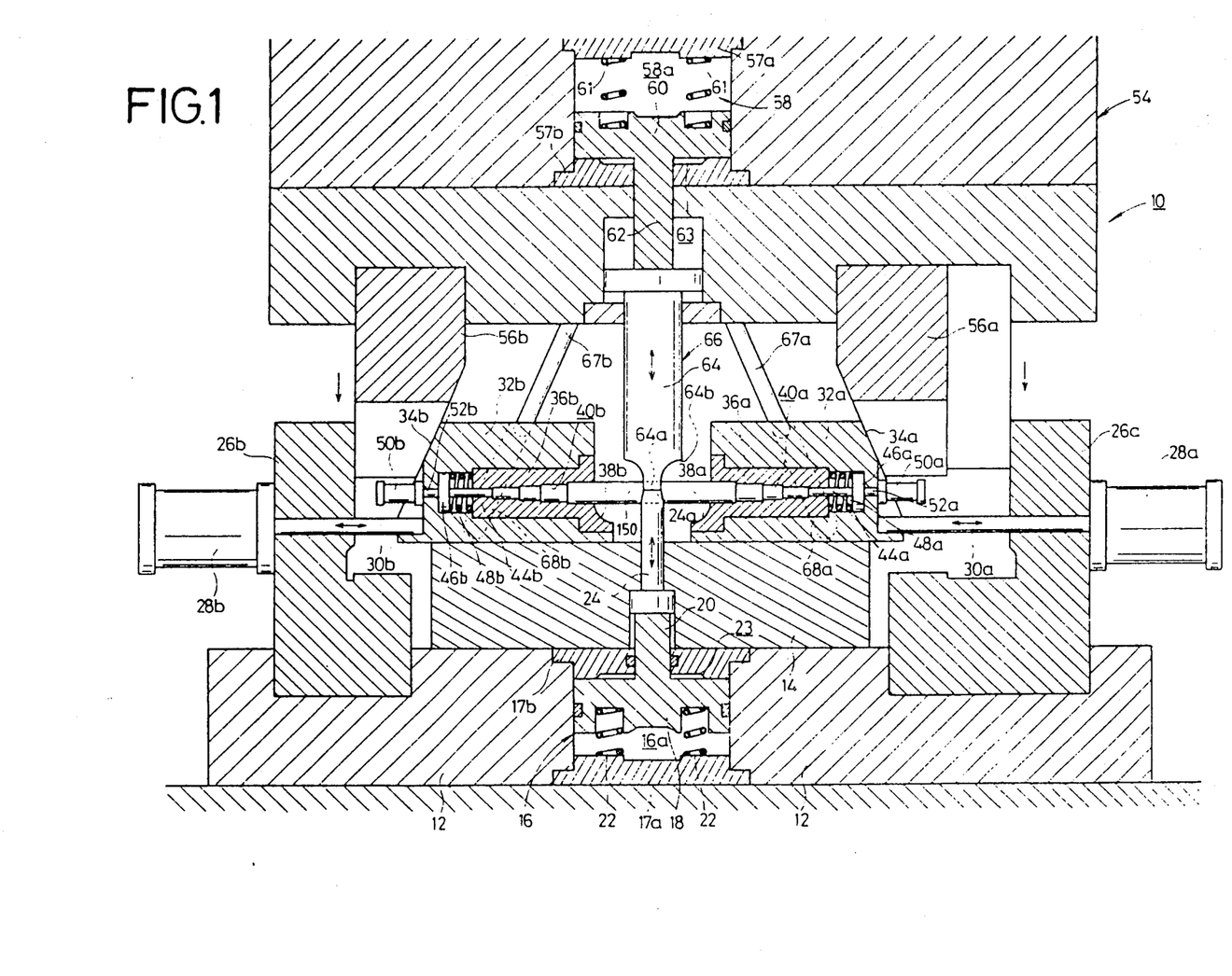
FIG. 1 is a vertical cross-sectional view of an apparatus for forming a shaped metallic article according to the present invention, the view showing a hollow blank pipe before it is forged into a crankshaft.
Figure 2:
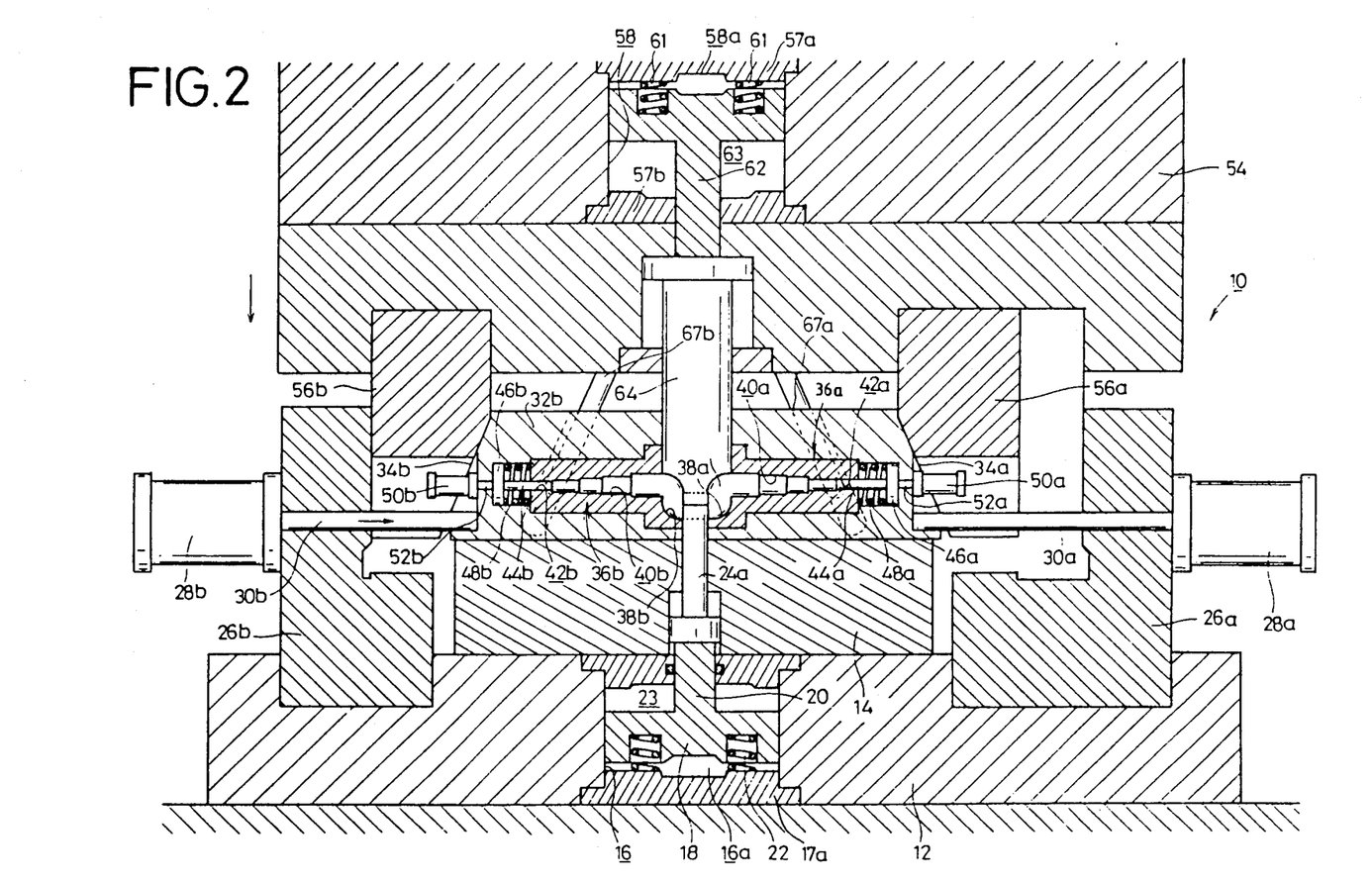
FIG. 2 is a view similar to FIG. 1, showing the hollow blank pipe which starts being formed into a crankshaft.

As shown in FIGS. 1 and 2, an apparatus 10 for forming a shaped metallic article such as a crankshaft according to the present invention includes a base 12 and a guide block 14 disposed substantially centrally on an upper surface of the base 12. The base 12 has a large-diameter hole defined therein below the guide block 14. A head cover 17a and a rod cover 17b are fitted respectively in the lower and upper ends of the large-diameter hole, thus providing a lower cylinder 16 in which a piston 18 is axially slidably fitted. A pressure chamber 16a, serving as a first main buffer, is defined between the piston 18 and the head cover 17a.

A piston rod 20 integrally projects upwardly from the upper end of the piston 18 through the rod cover 17b. The pressure chamber 16a houses a coil spring 22 acting between the piston 18 and the head cover 17a. The upper surface of the piston 18 and the rod cover 17b define therebetween a fluid buffer chamber 23, which serves as a first auxiliary buffer. The upper distal end of the piston rod 20 supports a bearing punch 24 which extends through a hole defined through the guide block 14. The bearing punch 24 has an arcuate bearing surface 24a on its upper distal end.

A pair of laterally spaced blocks 26a, 26b is vertically mounted on the base 12, one on each side of the guide block 14. The blocks 26a, 26b support cylinders 28a, 28b respectively thereon. The cylinders 28a, 28b have respective piston rods 30a, 30b extending toward each other in alignment, and respective slides 32a, 32b are connected to the distal ends of the piston rods 30a, 30b. The slides 32a, 32b are slidable toward and away from each other on the guide block 14. The slide 32a has an inclined surface 34a on an upper edge thereof, and houses a die 36a integrally therein.

The die 36a has on an outer end thereof a forming surface 38a having a predetermined shape for pressing a blank (described later) into a weight of a crankshaft. The die 36 also has a stepped hole 40a defined lateraly therethrough for axially swaging or squeezing the blank. The stepped hole 40a houses a punch 44a fitted therein.

The punch 44a is disposed in a chamber defined in the slide 32a and has an integral flange 46a on one end thereof. A coil spring 48a is interposed between the flange 46a and the inner end of the die 36a. The slide 32a supports on its outer end a cylinder 50a which includes a piston rod 52a extending into the slide 32a and engaging an end of the flange 46a.

The slide 32b is identical in construction to the slide 32a, and supports a die 36b, a punch 44b with a flange 46b, a coil spring 48b, and a cylinder 50b with a piston rod 52b, which are also identical to the die 36a, the punch 44a, the coil spring 48a, and the cylinder 50a. The punches 44a, 44b jointly serve as a first punch assembly.

Above the slides 32a, 32b, there is disposed a vertically movable body 54 which supports a pair of laterally spaced cams 56a, 56b slidably engaging vertical surfaces of the blocks 26a, 26b and the inclined surfaces 34a, 34b of the slides 32a, 32b. The vertically movable body 54 has a central large-diameter hole which is closed at its upper and lower ends by a head cover 57a and a rod cover 57b, respectively, thereby defining an upper cylinder 58 with a piston 60 slidably fitted therein. A pressure chamber 58a, serving as a second main buffer, is defined between an upper surface of the piston 60 and the head cover 57a. The pressure chamber 58a houses a plurality of springs 61 acting between the head cover 57a and the piston 60.

The piston 60 and the rod cover 57b define therebetween a fluid buffer chamber 63 which serves as a second auxiliary buffer. The piston 60 has an integral piston rod 62 extending downwardly and supporting on its lower distal end a presser punch 64 which has on its lower distal end an arcuate presser surface 64a and a forming surface 64b for forming counterweights of a crankshaft. The presser punch 64 and the bearing punch 24 jointly constitute a second punch assembly 66.

A pair of inclined pins 67a, 67b which spread outwardly in the downward direction is mounted on a lower surface of the vertically movable body 54 between the cams 56a, 56b. The slides 32a, 32b have a pair of upwardly open inclined holes 68a, 68b defined therein and spreading outwardly in the downward direction. The inclined pins 67a, 67b are axially movably loosely fitted respectively in the inclined holes 68a, 68b. The inclined pins 67a, 67b and the holes 68a, 68b which receive these pins 67a, 67b jointly constitute a cam mechanism which causes the slides 32a, 32b to move toward and away from each other when the vertically movable body 54 is vertically displaced with respect to the blocks 26a, 26b.

Figure 3:
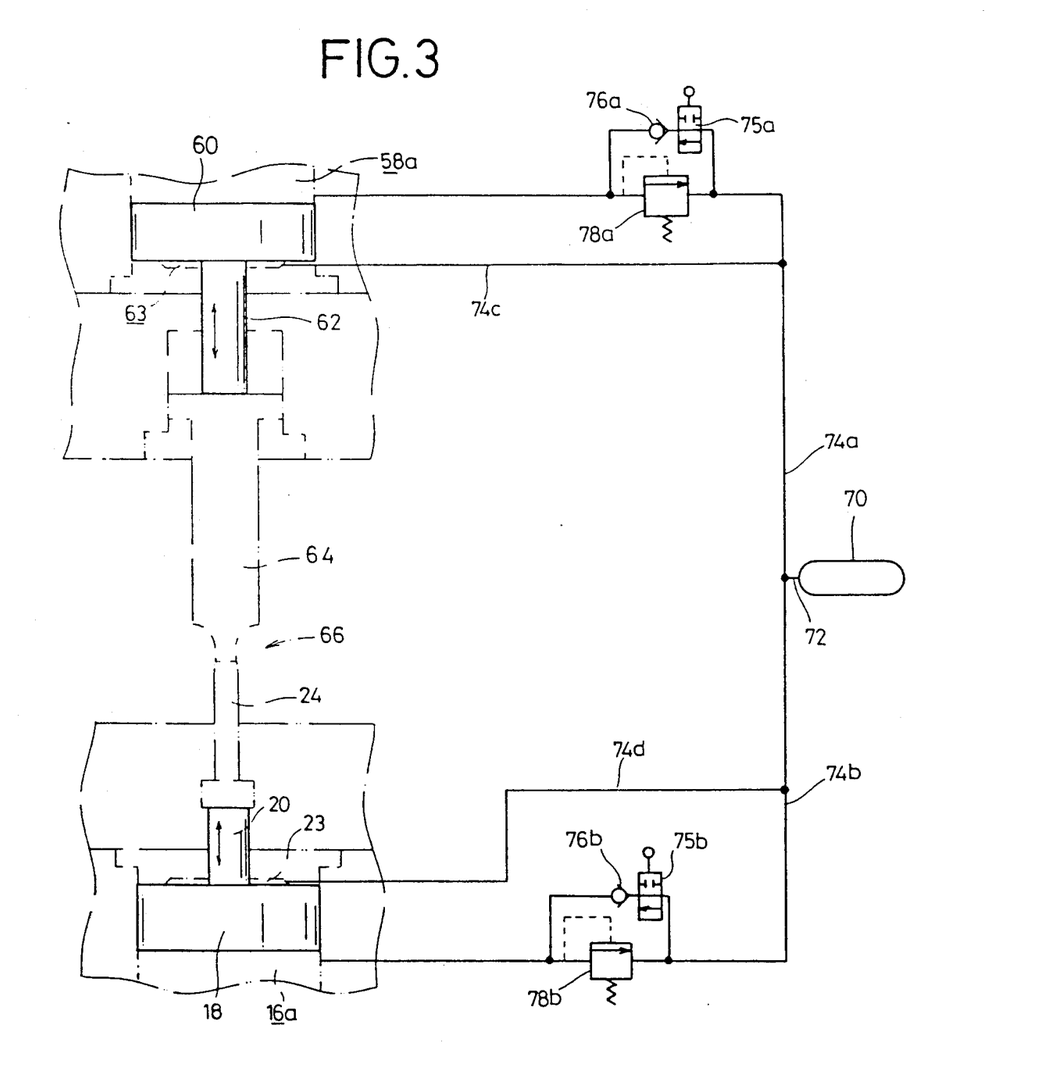
FIG. 3 is a circuit diagram of a hydraulic pressure circuit incorporated in the apparatus shown in FIG. 1.

FIG. 3 shows a hydraulic pressure circuit for hydraulically actuating the upper and lower cylinders 58, 16. The hydraulic pressure circuit includes an accumulator 70 as a source of hydraulic pressure, which is connected to a passage 72 branched into two passages 74a, 74b. The passage 74a is connected to a first shutoff valve 75a, a check valve 76a, and a relief valve 78a, which communicate with the pressure chamber 58a between the head cover 57a and the piston 60.

The passage 74b is connected to a second shutoff valve 75b, a check valve 76b, and a relief valve 78b, which communicate with the pressure chamber 16a between the piston 18 and the head cover 17a. The passage 74a is further branched into a passage 74c which communicates with the fluid buffer chamber 63, and the passage 74b is also branched into a passage 74d which communicates with the fluid buffer chamber 23.

The process of forming a crankshaft from a hollow blank or pipe using the apparatus 10 will be described below.

Figure 4:
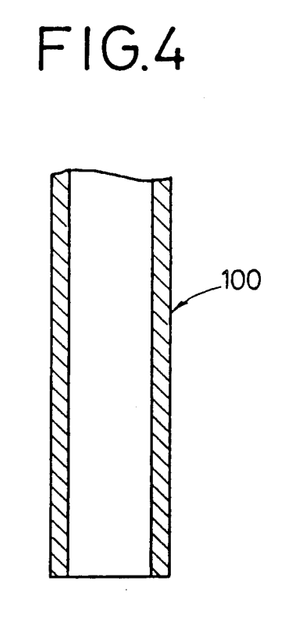
FIG. 4 is a fragmentary vertical longitudinal cross-sectional view of a pipe before it is squeezed and subjected to an RR forging process by the apparatus shown in FIGS. 1 through 3.
Figure 5:
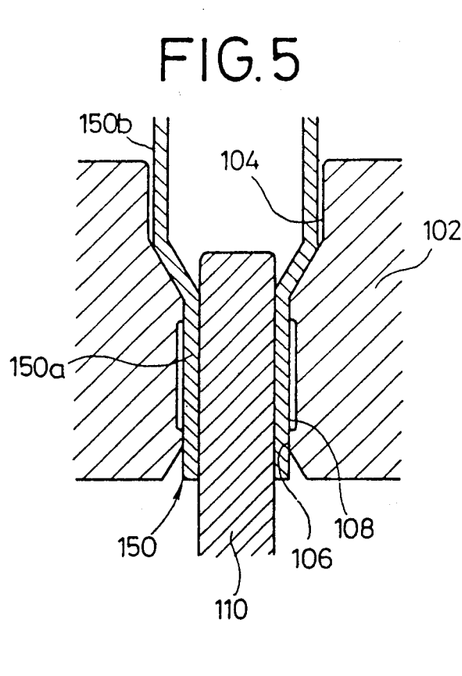
FIG. 5 is a fragmentary longitudinal cross-sectional view showing the manner in which the pipe is squeezed while it is constrained radially inwardly.

A pipe 100 of relatively large wall thickness (FIG. 4) is first placed in a die 102 (FIG. 5). The die 102 has a larger-diameter hole 104 and a smaller-diameter hole 106 axially spaced from and communicating with the larger-diameter hole 104. The die 102 also has a hole 108 defined between the holes 104, 106 and positioned more closely to the hole 106, the hole 108 having a diameter slightly greater than the diameter of the hole 106. The hole 108 serves to relieve the pipe 100 as it is squeezed.

Figure 6:
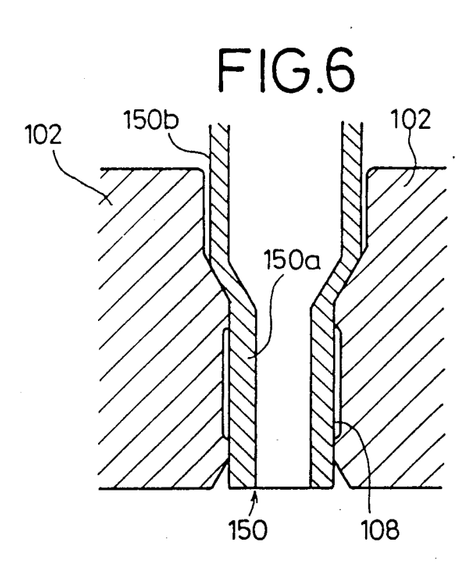
FIG. 6 is a fragmentary longitudinal cross-sectional view showing the manner in which the pipe is squeezed while it is not constrained radially inwardly.

While a metallic core rod 110 is being inserted through the pipe 100 from the hole 106 into the hole 108, the pipe 100 is squeezed into a hollow blank pipe 150 having portions of different diameters, i.e., a smaller-diameter portion 150a and a larger-diameter portion 150b. The smaller-diameter portion 150a is of a greater wall thickness than the larger-diameter portion 150b. If the core rod 110 is not used as shown in FIG. 6, the hollow blank pipe 150 is squeezed with its diameter being reduced radially inwardly, and therefore the smaller-diameter portion 150a has a greater wall thickness.

The hollow blank pipe 150 is heated by high-frequency induction heating at regions corresponding to the counterweights of a crankshaft which is to be produced therefrom. The hollow blank pipe 150 thus partially heated is then placed in the apparatus 10 shown in FIG. 1. More specifically, the slides 32a, 32b are moved away from each other by the cylinders 28a, 28b, and the vertically movable body 54 is elevated. Then, the hollow blank pipe 150 is put in the dies 36a, 36b.

The shutoff valve 75a is opened to supply a fluid, i.e., working oil, under pressure from the accumulator 70 through the check valve 76a to the pressure chamber 58a. The piston 60 is lowered to move the presser punch 64 downwardly.

A region of the hollow blank pipe 150, which corresponds to a crankpin of the crankshaft, is then clamped between the bearing surface 24a of the bearing punch 24 and the presser surface 64a of the presser punch 64. Since the bearing punch 24 is downwardly pressed by the presser punch 64, the bearing punch 24 is lowered, discharging working oil under pressure from the pressure chamber 16a through the relief valve 78b to the accumulator 70. Downward shocks on the bearing punch 24 are absorbed by the spring 22.

Thereafter, the vertically movable body 54 is bodily lowered, and the cylinders 28a, 28b are actuated to move the slides 32a, 32b toward each other. As a result, the opposite ends of the hollow blank pipe 150 are axially squeezed by the stepped holes 40a, 40b in the dies 36a, 36b, respectively. At this time, the inclined pins 67a, 67b projecting downwardly from the vertically movable body 54 are loosely fitted in the respective holes 68a, 68b in the slides 32a, 32b.

The cylinders 28a, 28b are further actuated to move the slides 32a, 32b toward each other until the axially squeezed opposite ends of the hollow blank pipe 150 are pressed by the distal ends of the punches 44a, 44b. Therefore, the hollow blank pipe 150 is provisionally axially compressed, producing increased-diameter portions complementary in shape to the forming surfaces 38a, 38b of the dies 36a, 36b and the forming surface 64b of the second punch assembly 66.

The vertically movable body 54 is further lowered to cause the cams 56a, 56b to push the inclined surfaces 34a, 34b of the slides 32a, 32b toward each other. Therefore, the opposite ends of the hollow blank pipe 150 are further axially compressed by the punches 44a, 44b, whereupon the regions of the hollow blank pipe 150, which correspond to the crankshaft counterweights, are pressed by the forming surfaces 38a, 38b of the dies 36a, 36b, and the crankpin is formed by the presser surface 64a of the presser punch 64.

As a result, a cylindrical crankshaft 200 of bent configuration is produced as shown in FIG. 2. The working oil under pressure in the pressure chamber 58a, as well as the resiliency of the springs 61, absorbs shocks produced by reactive forces applied to the presser punch 64. More specifically, the reactive forces applied to the presser punch 64 to displace the presser punch 64 upwardly are dampened by the hydraulic pressure in the pressure chamber 58a, thereby increasing the pressure of the oil in the pressure chamber 58a to force the oil from the pressure chamber 58a through the relief valve 78a to the accumulator 70.

Then, the vertically movable body 54 is elevated, and the cylinders 28a, 28b are actuated to retract the piston rods 30a, 30b. The inclined pins 67a, 67b and the piston rods 30a, 30b now displace the slides 32a, 32b away from each other. At this time, the slides 32a, 32b start moving away from each other slightly after the inclined pins 67a, 67b start moving upwardly because the inclined pins 67a, 67b are loosely fitted in the holes 68a, 68b in the slides 32a, 32b. Since the opposite ends of the crankshaft 200 are securely held by the dies 36a, 36b without any gap therebetween, the crankshaft 200 is not lifted by the presser punch 64 which is stuck to the crankshaft 200 when the vertically movable body 54 is elevated. At this time, the first shutoff valve 75a is closed, preventing oil under pressure from flowing into the pressure chamber 58a, and the oil in the fluid buffer chamber 63 prevents the piston 60 from being displaced downwardly. Likewise, the second shutoff valve 75b is closed, preventing oil under pressure from flowing into the pressure chamber 16a, and the oil in the fluid buffer chamber 23 prevents the piston 18 from moving upwardly.

Then, the cylinders 50a, 50b are actuated to displace the punches 44a, 44b toward each other against the resiliency of the coil springs 48a, 48b. The opposite ends of the crankshaft 200 are pushed by the punches 44a, 44b until finally the crankshaft 200 is removed or ejected from the dies 36a, 36b.

The second shutoff valve 57b is then opened to supply oil under pressure to the pressure chamber 16a to move the piston 18 upwardly, so that the bearing punch 24 is positioned for forging a next hollow blank pipe.

Figure 7A:
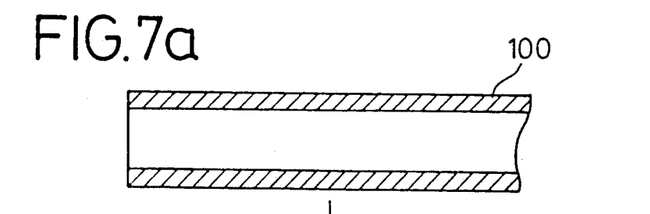
FIGS. 7a through 7c are fragmentary longitudinal cross-sectional views showing the manner in which a pipe is successively squeezed into a hollow blank pipe and forged into a crankshaft according to an RR forging process.
Figure 7B:
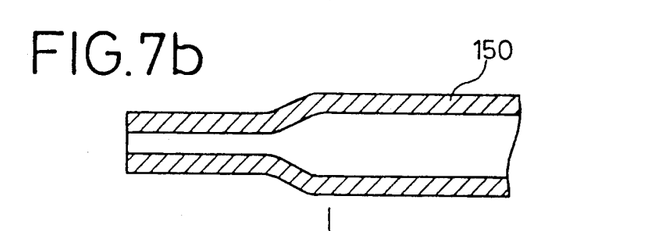
Figure 7C:
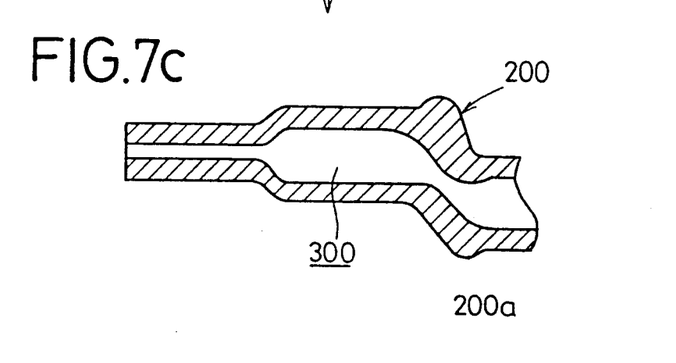

FIGS. 7a through 7c show successive steps of squeezing the pipe 100 into the hollow bank pipe 150 and then forging the hollow blank pipe 150 into the crankshaft 200 according to the RR forging process. More specifically, the pipe 100 shown in FIG. 7a is squeezed into the hollow blank pipe 150 shown in FIG. 7b. Then, the hollow blank pipe 150 is placed in the RR forging apparatus 10 and forged into the crankshaft 200 shown in FIG. 7c. As shown in FIG. 7c, the crankshaft 200 has a shank 200a, serving as a crankpin, of large wall thickness for higher rigidity.

Figure 8A:
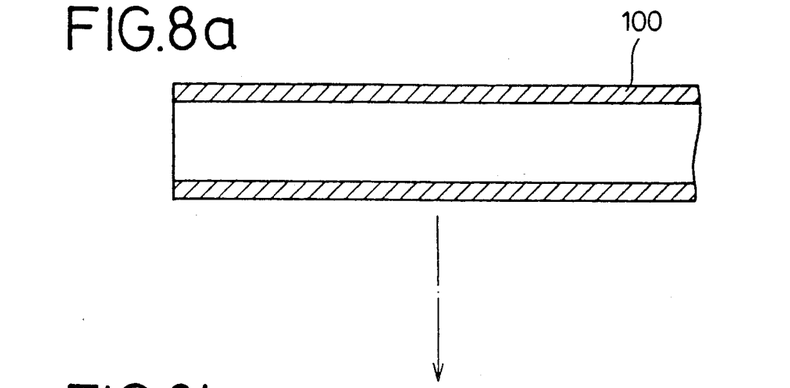
FIGS. 8a through 8c are views similar to FIGS. 7a through 7c, respectively, showing the manner in which a pipe is successively squeezed into a hollow blank pipe and forged into a crankshaft according to another embodiment of the present invention.
Figure 8B:
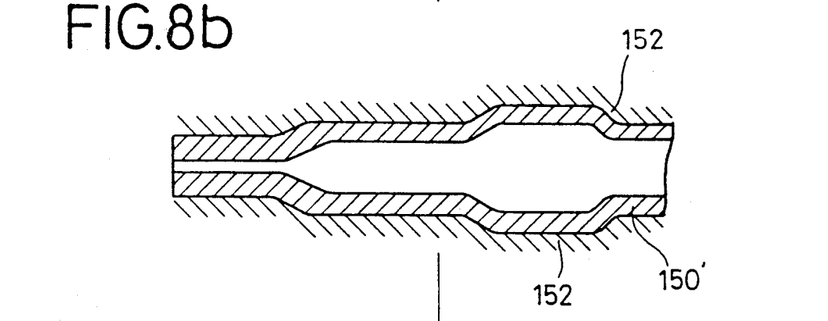
Figure 8C:
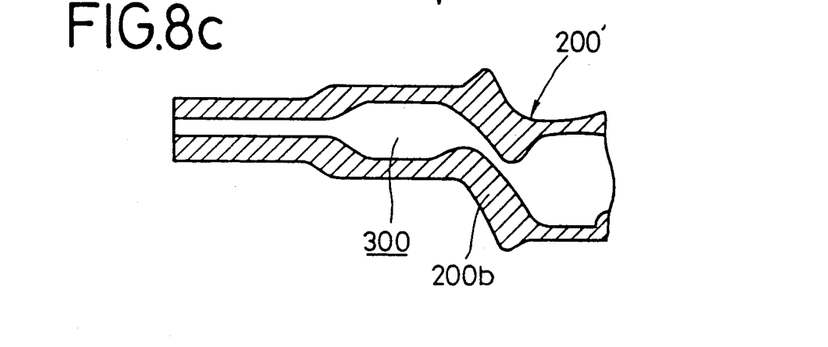

FIGS. 8a through 8c show the manner in which a pipe is successively forged into a crankshaft according to another embodiment of the present invention.

A pipe 100 shown in FIG. 8a is squeezed into a hollow blank pipe 150' by a die 152 shown in FIG. 8b. The hollow blank pipe 150' is then placed in the RR forging apparatus 10, and forged into a crankshaft 200' shown in FIG. 8c. The crankshaft 200' thus forged has a shoulder 200b of large wall thickness for sufficient rigidity or mechanical strength. The crankshafts 200, 200' shown in FIGS. 7c and 8c have oil passages 300, 300' defined axially therethrough. If such oil passages 300, 300' are not necessary, then the ends of the crankshafts 200, 200' may be closed off by the squeezing or RR forging process.

According to the above embodiments, the commercially available pipe 100 of standard dimensions is selected and first squeezed into the hollow blank pipe of desired wall thicknesses, which is then forged into the crankshaft by the RR forging process. The commercially available pipe 100 is usually of relatively small wall thickness. Therefore, when it is squeezed, the squeezing ratio or the percentage of diameter reduction of the pipe 100 is relatively small. Since, as a result, the hollow blank pipe 100 is prevented from cracking or buckling, the hollow blank pipe 100 can easily be squeezed. If the regions of the hollow blank pipe, which correspond to the counterweights (each composed of the shoulder 200b) of the crankshaft, are squeezed so that their diameter and wall thickness are adjusted in advance, the shape or wall thickness of the crankshaft can easily be adjusted when the hollow blank pipe is forged by the RR forging process.

Since the opposite ends of the hollow blank pipe are axially held and pressed by the punches 44a, 44b, the cylindrical crankshaft is not bent when it is removed. According to the conventional RR forging process, as a blank is held by a set of separate dies, the article forged from the blank is brought into abutment with, and easily deformed by, the dies, with the result that it has been difficult to produce cylindrical crankshafts of good quality with ease. Such a problem can however be solved according to the present invention.

The hollow blank pipe is upset by the punches 44a, 44b and the forming surfaces 38a, 38b of the dies 36a, 36b. Therefore, pressing forces large enough to form the counterweights 200b are applied to the hollow blank pipe, with the consequence that the crankshaft of desired shape can be manufactured reliably with high accuracy.

Using the dies 36a, 36b integral with the respective slides 32a, 32b, the hollow blank pipe 150, 150' is axially squeezed by the stepped holes 40a, 40b in the dies 36a, 36b, and then successively bent and upset. Consequently, the overall process is much more efficient than the conventional process for forming crankshafts.

The axially squeezed hollow blank pipe 150, 150', cannot easily be removed from the dies 36a, 36b because the axially squeezed hollow blank pipe is intimately retained in the dies 36a, 36b. According to the present invention, however, the dies 36a, 36b are retracted away from each other while the opposite ends of the crankshaft 200, 200' are pressed by the punches 44a, 44b actuated by the respective cylinders 50a, 50b. Therefore, the crankshaft 200, 200' can easily and reliably be ejected from the dies 36a, 36b.

The dies 36a, 36b are integrally housed in the respective slides 36a, 36b. Therefore, the apparatus 10 is simpler and smaller than the conventional apparatus which employs separate dies.

When the vertically movable body 54 is elevated after the crankshaft 200, 200' is formed, the dies 36a, 36b integral with the slides 32a, 32b are moved away from each other by the upward movement of the outwardly spreading pins 67a, 67b and the operation of the cylinders 28a, 28b. Therefore, upon ascending movement of the vertically movable body 54, the presser punch 64 is elevated, and immediately thereafter the slides 36a, 36b are moved away from each other with a slight time delay. Accordingly, the period of time required to separate the crankshaft 200, 200' from the dies 36a, 36b is shortened, and hence the total period of time required to form the crankshaft 200, 200' is reduced.

When the vertically movable body 54 is elevated after the formation of the crankshaft 200, 200', the first shutoff valve 75a is closed, preventing oil under pressure from flowing into the pressure chamber 58a which has a pressure buffer function. The fluid buffer chamber 63 below the piston 60 keeps the piston rod 62 in a lifted position, and prevents the presser punch 64 from being displaced downwardly, so that the presser punch 64 ascends in unison with the vertically movable body 54. Therefore, with the presser punch 64 already separated from the crankshaft 200, 200', the dies 36a, 36b are displaced away from the crankshaft 200, 200', which can thus be held out of pressed contact with other components and is prevented from being bent.

If oil under pressure were introduced into the pressure chamber 58a upon upward movement of the vertically movable body 54, and the presser punch 64 could not immediately follow the upward movement of the vertically movable body 54 because of the resiliency of the spring 61 on the upper surface of the piston 60, the presser punch 64 would be lifted when there is a gap between the crankshaft 200, 200' and the dies 36a, 36b from which the crankshaft 200, 200' has started being separated. The crankshaft 200, 200' attached to the presser surface 64a of the presser punch 64 would thus be lifted with the presser punch 64, and brought into hitting engagement other components, with the result that the crankshaft 200, 200' might be bent thereby. According to the present invention, the above drawback can be eliminated.

When the vertically movable body 54 is lifted and the crankshaft 200, 200' is separated from the dies 36a, 36b, the high-pressure oil in the pressure chamber 58a is delivered through the relief valve 78a to the accumulator 70. At this time, the second shutoff valve 75b is closed, and there is oil under pressure in the fluid buffer chamber 23 above the piston 18. Therefore, the bearing punch 24 is prevented from moving upwardly, and hence does not elevate the crankshaft 200 whose opposite end portions are held in the dies 36a, 36b. This is also effective in preventing the crankshaft 200, 200' from being bent.

Figure 9A:
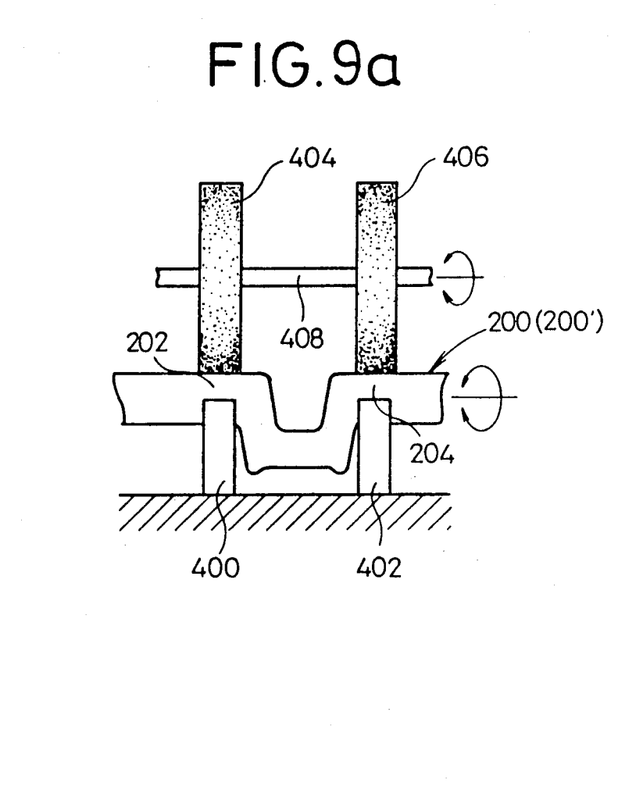
FIGS. 9a and 9b are schematic front and side elevational views, respectively, of a device for correcting a formed crankshaft out of a bent configuration.
Figure 9B:
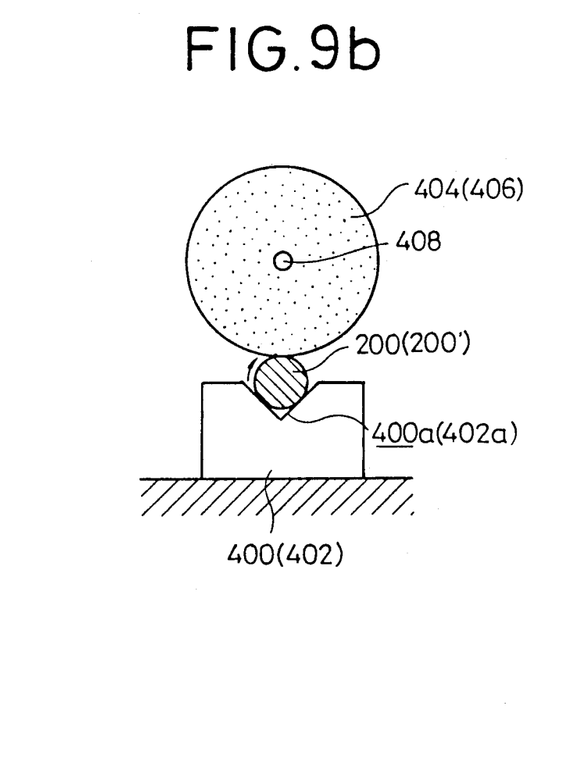

The crankshaft 200, 200' thus formed by the RR forging process is rolled so that it can be corrected out of a bent configuration that may be caused by springback or the like, as shown in FIGS. 9a and 9b. According to the rolling process shown in FIGS. 9a and 9b, two V blocks 400, 402 are employed which are spaced from each other and have respective V grooves 400a, 402a defined in their respective upper surfaces. Journals 202, 204 of the crankshaft 200, 200' are placed respectively in the V grooves 400a, 402a. Two grinding wheels 404, 406 are rotatably held in pressed contact with the journals 202, 204, respectively, on their sides opposite to the V blocks 400, 402. The grinding wheels 404, 406 are rotated about their common axis by a shaft 408 which is rotated by a rotative drive source (not shown).

In operation, the grinding wheels 404, 406 are lowered from an upper position into pressed contact with the journals 202, 204, and then the shaft 408 is rotated by the rotative drive source. As a consequence, the grinding wheels 404, 406 roll the journals 202, 204, respectively, to correct them out of any bent configuration.

Therefore, the journals 202, 204 of the crankshaft 200, 200' can be corrected by the rolling process. The rolling process is inexpensive, and requires no advance measurements of the direction in which the journals 202, 204 may be bent and the degree to which they are bent.

Figure 10:
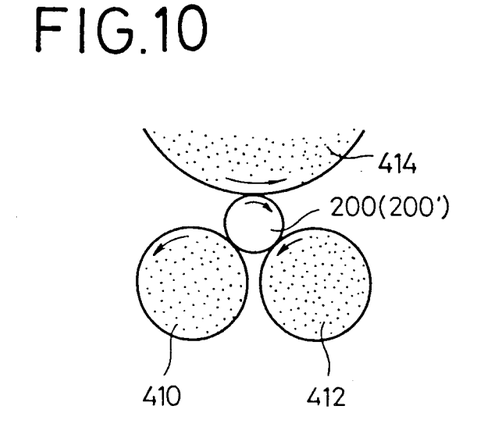
FIG. 10 is a schematic side elevational view of a device for correcting a formed crankshaft out of a bent configuration according to another embodiment of the present invention.

FIG. 10 shows a rolling mechanism according to another embodiment of the present invention, for correcting a crankshaft out of a bent configuration. The rolling mechanism shown in FIG. 10 has two smaller-diameter grinding wheels 410, 412 and a single larger-diameter grinding wheel 414. The crankshaft 200, 200' is sandwiched between the grinding wheels 410, 412 and the grinding wheel 414 and rolled thereby.

Figure 11:
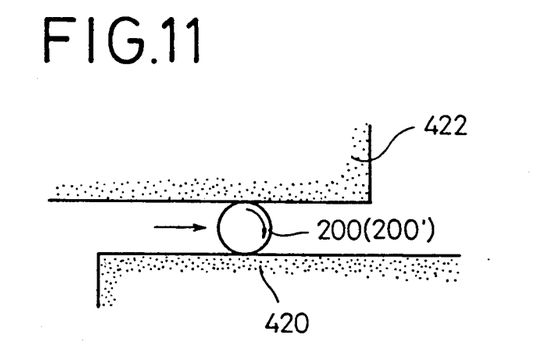
FIG. 11 is a schematic side elevational view of a device for correcting a formed crankshaft out of a bent configuration according to still another embodiment of the present invention.

FIG. 11 shows a rolling mechanism according to still another embodiment of the present invention, for correcting a crankshaft out of a bent configuration. The rolling mechanism shown in FIG. 11 has two grinding blocks 420, 422 movable back and forth parallel to each other. The crankshaft 200, 200' is sandwiched between the grinding blocks 420, 422 and rolled thereby.

The crankshaft 200, 200' thus rolled and corrected may be further ground so that the crankshaft 200, 200' is corrected more accurately out of any bent shape.

With the present invention, as described above, a hollow blank of small wall thickness may be a commercially available pipe which can easily be obtained. Therefore, when a crankshaft is produced from such a commercially available pipe, the crankshaft can be manufactured inexpensively. When the pipe is to be squeezed into a hollow blank pipe having portions of different diameters, if the pipe is squeezed while not being constrained radially inwardly, the percentage of diameter reduction is small, and hence the pipe can be squeezed to a large extent at one time. Because the wall thickness and size of the hollow blank pipe can easily be adjusted, hollow banks or pipes that are available on the market can freely be selected without limitations on their dimensions and wall thicknesses. The hollow blank pipe can be forged without undue stresses according to the RR forging, and thus is prevented from being made defective, e.g., cracking and buckling.

Furthermore, since the dies are integral with the respective dies, the apparatus is simpler and smaller than the conventional apparatus which employs separate dies.

When the vertically movable body is elevated after the desired crankshaft is formed, the dies are moved away from each other by the outwardly spreading inclined pins and the operation of the cylinders. Upon the upward movement of the vertically movable body, the presser punch is elevated, and the dies are displaced away from each other after a slight time delay. Thus, the time required to separate the crankshaft from the dies is shortened, and the total time to form the crankshaft is also reduced.

When the vertically movable body is elevated after the crankshaft is formed, the first shutoff valve is closed preventing oil under pressure from flowing into the pressure chamber, and the presser punch is not pressed downwardly due to the fluid buffer chamber. Thus, the presser punch ascends in unison with the vertically movable body. The dies start being separated from the crankshaft when the presser punch has already been separated from the crankshaft. The presser punch has already been moved upwardly when there is a gap between the dies and the crankshaft separated from the dies, and therefore the crankshaft is not lifted by the presse punch. Since the crankshaft is not lifted by the presser punch, the crankshaft does not hit other components and is not bent thereby.

When the vertically movable body is thus elevated, the oil under pressure is discharged from the upper cylinder. At this time, the second shutoff valve is closed, and the fluid buffer chamber in the lower cylinder prevents the bearing punch from being displaced upwardly. Upon retraction of the dies, the crankshaft whose opposite ends are held by the dies is prevented from being bent.

Moreover, the opposite ends of the blank are upset by being axially compressed, and a region of the blank is pressed and bent in a direction normal to the axial direction of the blank according to the RR forging. Thereafter, shanks of the forged blank are rolled so that they are corrected out of a bent configuration. The shanks of the forged blank can thus be corrected out of any bent shape uniformly over their entire circumferential surfaces inexpensively without the need for advance measurements of the direction in which it is bent and the degree to which it is bent.

Although certain preferred embodiments have been shown and described, it should be understood that many changes and modifications may be made therein without departing from the scope of the appended claims.

What is claimed is:

1. A method of forming a shaped metallic article, comprising the steps of:
   gripping a portion of an elongate blank with a pair of punches with terminal ends of the gripped portion extending on either side of the pair of punches;
   upsetting and bending the blank with dies positioned one on each side of the gripped portion of the blank by moving toward each other into engagement with the terminal ends of the blank, and with said punches, thereby forming an elongate article into a crankshaft having journals; and
   thereafter, rolling said journals of the elongate article to correct the same out of a bent configuration.

2. The method for forming a shaped metallic article as recited in claim 1, wherein said elongated blank is a hollow blank pipe and further comprising, before said gripping step, the steps of: squeezing a hollow pipe having a predetermined wall thickness into a hollow blank pipe having a predetermined shape and wall thickness; and
   locally heating a region of said hollow blank pipe.

3. The method of forming a shaped metallic article as recited in claim 2, wherein said squeezing step comprises the step of uniformizing the wall thickness of said pipe to a substantially constant wall thickness.

4. The method of forming a shaped metallic article as recited in claim 2, wherein said squeezing step comprises the step of squeezing a selected region of the pipe to increase the wall thickness of the squeezed region.

5. The method of forming a shaped metallic article as recited in claim 3 or 4, wherein said squeezing step comprises the steps of inserting a core rod into the pipe and squeezing the pipe while constraining the pipe radially inwardly with said core rod.

6. The method of forming a shaped metallic article as recited in claim 1, comprising, after said upsetting and bending steps and before said rolling step, the step of releasing one of said punches from the blank before the dies are separated from the blank.

7. The method according to claim 6, further comprising the step of ejecting the blank after the dies are separated from the blank.

* * * * *